(12) United States Patent
Moerig et al.

(10) Patent No.: US 6,842,701 B2
(45) Date of Patent: Jan. 11, 2005

(54) METHOD OF NOISE REMOVAL FOR CASCADED SWEEP DATA

(75) Inventors: Rainer Moerig, Houston, TX (US); Frederick J. Barr, Pearland, TX (US)

(73) Assignee: WesternGeco L.L.C., Houston, TX (US)

( * ) Notice: Subject to any disclaimer, the term of this patent is extended or adjusted under 35 U.S.C. 154(b) by 0 days.

(21) Appl. No.: 10/082,570

(22) Filed: Feb. 25, 2002

(65) Prior Publication Data

US 2003/0163260 A1 Aug. 28, 2003

(51) Int. Cl.[7] .............................................. G06F 19/00

(52) U.S. Cl. ............................................ 702/14; 703/5

(58) Field of Search .......................... 702/14, 1, 2, 17; 703/5; 367/38, 41, 48, 75, 40, 73

(56) References Cited

U.S. PATENT DOCUMENTS

| | | | | |
|---|---|---|---|---|
| 4,042,910 | A | 8/1977 | Rietsch ................ | 340/15.5 TA |
| 4,561,075 | A | 12/1985 | Smith et al. ............ | 367/46 |
| 4,635,239 | A | 1/1987 | Neff ....................... | 367/47 |
| 4,715,020 | A | 12/1987 | Landrum, Jr. ........... | 367/38 |
| 4,823,326 | A | 4/1989 | Ward ..................... | 367/41 |
| 4,882,713 | A | 11/1989 | Hughes .................. | 367/47 |
| 4,982,374 | A | 1/1991 | Edington et al. ........ | 367/48 |
| 5,410,517 | A * | 4/1995 | Andersen ................ | 367/75 |
| 6,418,079 | B1 * | 7/2002 | Fleure .................... | 367/40 |
| 6,519,533 | B1 * | 2/2003 | Jeffryes ................. | 702/17 |

FOREIGN PATENT DOCUMENTS

GB 2289336 A * 11/1995 ............ G01V/1/36

OTHER PUBLICATIONS

Xiao–Ping Li et al.; *Elimination of harmonic distortion in vibroseis data,* Geophysics, vol. 60, No. 2 (Mar.–Apr. 1995); pp. 503–516, 12 Figures.

Joseph K. Schrodt et al.; *Techniques for improving Vibroseis data,* Geophysics, vol. 52, Apr. 1987, No. 4, pp. 469–482, 17 Figures.

G.J.M. Baeten, et al.; *Acquisition and processing of point source measurements in land seismic,* SEG. 2000 Expanded Abstracts, 70th Annual International Mtg., pp. 45–48.

Roger M. Ward et al.; *Phase Encoding of Vibroseis Signals for Simultaneous Multisource Acquisition,* SA 4.3, SEG 1990, 60th Annual International Mtg., pp. 938–941.

J.E. Martin et al., *Behavior of a Seismic Vibrator Using Different Phase Control Methods and Drive Levels,* SA 3.4, SEG 1989, 59th Annual International Mtg., pp. 672–675.

J.E. Martin; *Simultaneous Vibroseis Recording,* Geophyical Prospecting 41, 1993, pp. 943–967.

* cited by examiner

*Primary Examiner*—John Barlow
*Assistant Examiner*—Victor J. Taylor
(74) *Attorney, Agent, or Firm*—Madan, Mossman & Sriram, P.C.

(57) ABSTRACT

The present invention is a method for processing seismic data comprising acquiring seismic data using a sweep sequence including a plurality of cascaded sweep segments. The seismic data include a plurality of data segments and a listen time. The listen is combined with an initial data segment. The seismic data segments are phase shifted to a phase of a target data segment to be denoised (i.e. removal of ambient, harmonic and coherent noise). A difference between the target data segment and the remaining data segments is determined. If the determined difference exceeds a predetermined threshold, data in the target data segment is replaced with data derived from the remaining data segments. The data segments may be stacked to form a new target data segment. The listen time is extracted from the initial data segment.

10 Claims, 6 Drawing Sheets

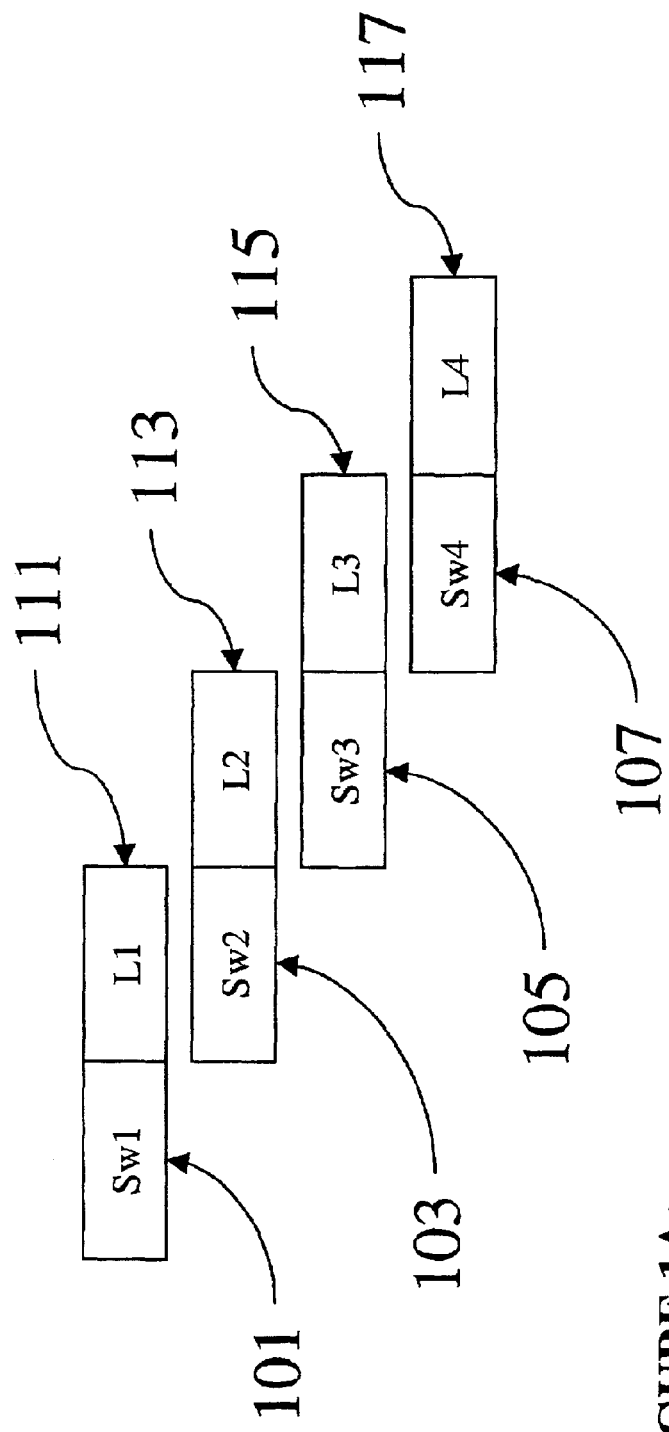
FIGURE 1A: Variphase Gathers

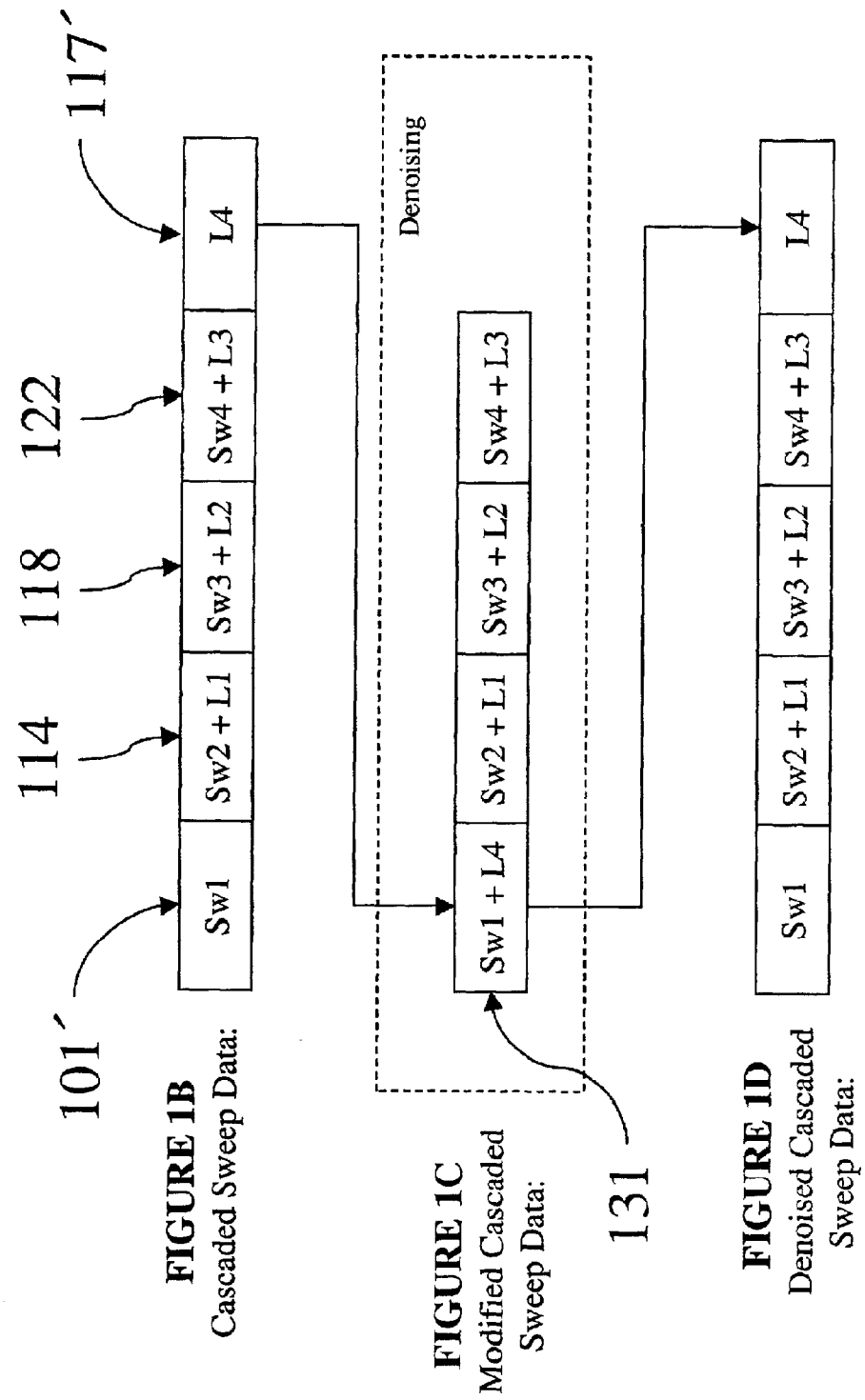

METHOD OF NOISE REMOVAL FOR CASCADED SWEEP DATA

FIELD OF THE INVENTION

This invention relates to the field of geophysical prospecting and, more particularly, to a method for removing noise from seismic data.

BACKGROUND OF THE INVENTION

The seismic exploration industry uses acoustic impulses to impart sonic vibrations into the earth to delineate subsurface structure for mineral exploration and development. These acoustic waves may be from an explosive, implosive, swept-frequency (chirp) or random source. A recording of the acoustic reflection and refraction wavefronts that travel from the source to a receiver is used to produce a seismic field record. Variations in the travel times of reflection and refraction events in these field records indicate the position of reflection surfaces within the earth. The analysis and correlation of events in one or more field records in seismic data processing produces an acoustic image that demonstrates subsurface structure. The acoustic images are used to find valuable mineral deposits.

The swept-frequency or chirp type seismic source may utilize a relatively long pilot signal such as 2 to 15 seconds to assure sufficient energy is imparted to the earth. The swept-frequency or chirp type source method relies on signal compression to compress the signal and ensure sufficient vertical resolution to resolve the position of subsurface reflectors. Signal compression generally is called deconvolution, with many techniques well known in the art of seismic data processing. Deconvolution of sweep or chirp signals compresses the source signal into a much shorter signal representative of a subsurface reflective boundary. The accuracy and effectiveness of any deconvolution technique is directly related to how well the source signal is known or understood. Most deconvolution operators are derived from statistical estimates of the actual source waveform.

With a swept frequency type source the energy is emitted in the form of a sweep of regularly increasing (upsweep) or decreasing (downsweep) frequency in the seismic frequency range. The vibrations are controlled by a control system, which can control the frequency and phase of the seismic signals.

Swept frequency sources are relatively low energy compared to impulsive sources like dynamite or air-guns. Because of the low energy nature of the swept frequency source, noise problems can be significant. Coherent and ambient noise present in the environment where the data are acquired may interfere with desired signals. In addition, source generated harmonic energy may be an additional source of energy manifesting as noise, distortion or interference with recorded data.

The vibrational or swept frequency source generates harmonics which, in certain circumstances, can have an energy approaching or even exceeding the fundamental, and which can crossfeed with signals from other sources, giving misleading results when the signals are processed to separate the signals from each source. In addition, the harmonics are a source of noise that can mask weak reflection signals from deeper layers.

When only one seismic source is used, the seismic surveys can be very time-consuming. With modern signal processing methods this period may be shortened if more than one seismic source is be used simultaneously. Multiple sources can be used if some means for distinguishing between signals emanating from the different sources can be provided. The 'variphase' method is an example of such a method discussed by Ward et al., 1990, and by Bacon and Martin, 1993. The 'variphase' method may be employed as concurrent sweeps using a plurality of sources or a single source. Alternatively, the variphase method may be used by concatenating sweeps together using either one source or a plurality of simultaneously operating sources. A method of concatenating sweep segments having different phases and which may be used with a plurality of sources is disclosed in application Ser. No. 09/981,224, filed Oct. 17, 2001 and assigned to the assignee of this invention and which is incorporated herein by reference.

A method of signal separation from multiple vibratory sources using phase shifting of the signals on different sweeps is disclosed in U.S. Pat. No. 4,715,020 to Landrum. However, the problem of source generated harmonic or nonlinear distortion and crossfeed is not addressed in this patent.

A method for attenuating source generated harmonic correlation noise caused by harmonic energy output from seismic vibrators was developed by Reitsch as disclosed in U.S. Pat. No. 4,042,910. The method includes the step of generating a plurality of sweep signals in series and with the phase of each succeeding sweep signal being shifted relative to the previous one by a predetermined phase angle that is a fraction of $2\pi$. The generated signals are separately recorded and transformed by inverse phase shifting before being added or stacked in a conventional manner. Using this method, a series of N sweep segments are output by the vibrators (one for each record) that differ only in phase. Correlation noise up the Nth harmonic is attenuated. This method provides a method of suppressing harmonics using phase shifting, but only for a single vibratory source, and crossfeed is not addressed.

U.S. Pat. No. 4,823,326 to Ward, claims a method for separating seismic records derived from multiple, concurrently operated vibrational seismic sources, with reduced harmonic distortion.

U.S. Pat. No. 4,982,374 to Edington and Khan is a method for reducing the distortion and crossfeed from any selected order harmonic for any number of vibratory seismic sources operated concurrently, at the same time providing for separation of the signals from the different sources and for improving the signal-to-noise ratio. After determining the highest order harmonic likely to cause distortion, a number of sweeps of each source in each position is selected. This number depends upon the number of sources and the highest order harmonic to be suppressed. Initial phase angles for each sweep of each source are then selected to permit signal separation while suppressing harmonics up to and including that highest order harmonic.

U.S. Pat. No. 5,410,517 to Andersen discloses a method of cascading sweep segments to suppress unwanted harmonic energy. The method uses sweep segments having varying phase angles such that harmonic energy in the correlated wavelets is attenuated. According to the method, a first cascaded sweep sequence is generated containing N sweep segments linked end-to-end. The N sweep segments are substantially identical, except that the initial phase angle of each sweep segment within the sweep sequence is progressively rotated by a constant phase increment of about 360/N degrees. A second cascaded sweep sequence is generated comprising: (i) N consecutive sweep segments linked end-to-end which correspond to said first cascaded sweep sequence, and (ii) an additional sweep segment linked to the N consecutive sweep segments which is positioned and phased so as to substantially suppress harmonic ghosts during correlation. One of these cascaded sweep sequences is used for the vibrator sweep sequence and the other is used for the correlation reference sequence.

None of the prior art methods addresses coherent, ambient and harmonic noise all at the same time. There is a need for a method of data acquisition that addresses coherent, ambient and harmonic noise in vibrator data records simultaneously.

SUMMARY OF THE INVENTION

A method for processing seismic data comprising comparing data in a window of a portion of a first data segment with data in a corresponding window comprising a portion of a second data segment, wherein said first data segment and said second data segment are selected from a plurality of data segments acquired using a plurality of seismic sweeps. Data in a window are changed using said data in a corresponding window based on said comparison.

BRIEF DESCRIPTION OF THE DRAWINGS

The present invention and its advantages will be better understood by referring to the following detailed description and the attached drawings in which:

FIG. 1a illustrates a series of vibrator sweeps and listen times;

FIG. 1b illustrates the superposition of the sweeps and listen times of FIG. 1a to represent a cascaded sweep sequence;

FIG. 1c illustrates a modified cascaded sweep data sequence from the data of FIG. 1b;

FIG. 1d illustrates a cascaded sweep data sequence after noise has been removed;

Figure 2:
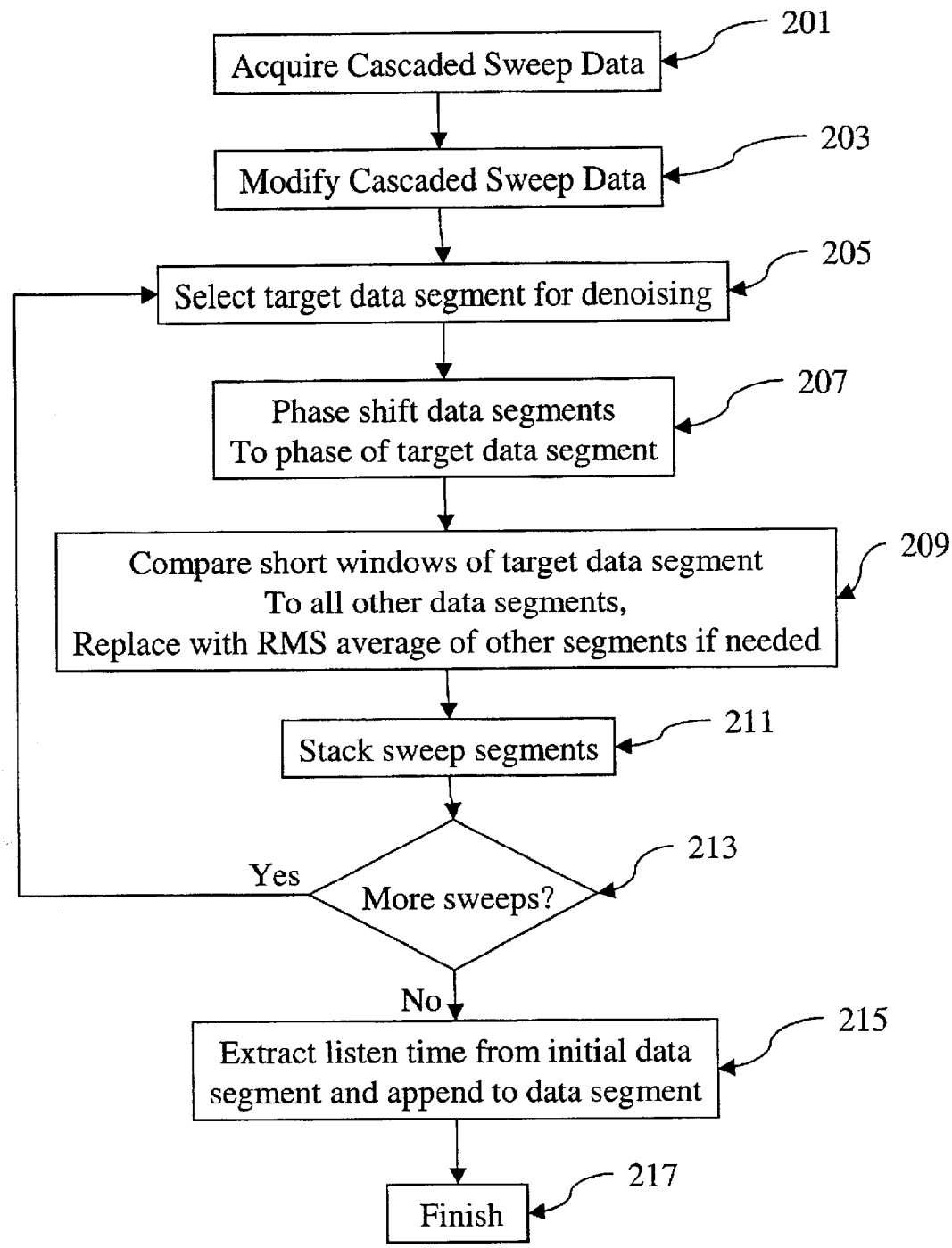
FIG. 2 illustrates a flowchart of the present invention.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method for cascading or linking seismic vibrator sweeps together which is directed to addressing noise problems due to coherent, ambient and harmonic noise. The invention provides suppression of undesirable noise within a single vibrator sweep sequence. Coherent noise is removed by replacing noise-contaminated data with an estimate of the underlying signal. Harmonic and ambient noise is highly attenuated by stacking phase-shifted data. Other advantages of the invention will be readily apparent to persons skilled in the art based on the following detailed description. To the extent that the following detailed description is specific to a particular embodiment or a particular use of the invention, this is intended to be illustrative and is not to be construed as limiting the scope of the invention.

Seismic vibrator data may be recorded from vibrators imparting energy using cascaded sweeps. Cascaded sweeps are made up of several sweep segments wherein the signal in different sweep segments is essentially the same except for the initial phase. Exploiting this redundancy in cascaded sweep data, coherent noise is removed by replacing noise contaminated data with an estimate of the underlying signal, whereby ambient and harmonic distortion noise are highly attenuated by stacking the segments. The disclosed method can also be applied to variphase vibrator data and 'alternate sweeping' methods (Ward, et al., 1990. Bacon and Martin, 1993) or, in a slightly modified version and with no harmonic attenuation, to non-phase-rotated conventional multi-sweep data acquired for the same source position. A method of concatenating sweep segments having different phases and which may be used with a plurality of sources is disclosed in application Ser. No. 09/981,224, filed Oct. 17, 2001 and assigned to the assignee of this invention and which is incorporated herein by reference.

A cascaded-sweep sequence is formed by placing several short sweep segments end-to-end to form one long sweep sequence. Each short sweep within a cascaded sequence is defined as a sweep segment, and the individual sweep segments can be joined with or without padding (listen time) in between. The individual sweep segments are typically 1–16 seconds in length, with 4–8 second lengths being common. The amount of padding can range from zero to the normal listen time used in conventional vibroseis prospecting. Concatenating sweep segments, that is sweep segments joined without padding, provides the most efficient operation. For example, eight conventional 4-second sweeps, each having a listen time, could be replaced by one cascaded sweep sequence consisting of eight 4-second seismic sweep segments, thereby reducing the number of listen periods during data acquisition from eight to one while maintaining the same total sweep effort (32 sweep seconds).

Cascaded sweep sequences are comprised of seismic sweep segments. Cascaded sweep sequences are used to drive vibrators to impart energy into the earth. The energy imparted into the earth is recorded as cascaded sweep sequence data. This recorded seismic sweep sequence data is made up of a plurality of data segments. A data segment may contain a recorded seismic sweep segment, a listen time, or a combination of both. While cascaded sweep sequence data is actually one long recorded data record (of several data segments) including a listen time data segment, it can also be considered as the superposition of time-shifted variphase data gathers or as a combination of superposed conventional seismic sweep data records. Although the preferred embodiment may be applied to cascaded sweep data, in an alternate embodiment of the present invention, conventional or variphase seismic sweep data records may be combined, for example by time series addition, to form a cascaded sweep data sequence and processed according to the method of the present invention. In still another embodiment, conventional seismic sweep data or variphase records may be processed directly with the method of this invention.

FIG. 1a shows four data sequences 101, 103, 105 and 107 with listening times 111, 113, 115 and 117 that may be combined to form the cascaded data of FIG. 1b which is a data record that includes five data segments, one of which is a listen time. The sweep lengths shown in FIG. 1a are equal to the same lengths as for listening, but this is not required. While the example described with reference to FIGS. 1a–1d is a four sweep segment example, any number of sweep segments may be used.

FIG. 1b, the cascaded sweep data, may be considered to be the concatenation of 5 data segments:

1. data 101' recorded during the first seismic sweep segment (Sw1);
2. the combination 114 of the data recorded during second seismic sweep segment (Sw2) coincident in time with the first sweep listen time (L1);
3. the combination 118 of the data recorded during the third seismic sweep segment (Sw3) with the second sweep listen time (L2);
4. the combination 122 of the data recorded during the fourth seismic sweep segment (Sw4) with the third sweep listen time (L3);
5. the last segment 117' represents data recorded during the listen time (LA) which follows the fourth sweep of this four seismic sweep segment example.

Because of this internal structure, the first data segment of the acquired cascaded sweep data 101' is different from all other segments since the recorded data contains the data acquired during seismic sweep segment (Sw1) but does not contain listen time reflection data from a previous sweep segment. On the other hand, the last segment 117' represents only data recorded during a listen time (LA) in which no energy is generated by the vibrators.

In order for all data segments to have the same data structure and so to be able to consistently "denoise" (defined herein as noise removal) the cascaded sweep data segments, the last data segment 117' (a 'listen time' data segment) of the FIG. 1b cascaded sweep data is combined with the first data segment 101 as illustrated by FIG. 1c to create a modified cascaded sweep data series. This modified cascaded sweep data series is defined to be modified seismic data. The combination of the final listen time 117' with the first segment 101 of the cascaded sweep data may be by time series addition. The first segment 131 in FIG. 1c now contains data recorded during the first sweep segment (Sw1) and data recorded during the listen time (LA) for the fourth sweep.

This modified seismic data, shown as the modified cascaded sweep data sequence in FIG. 1c, is to be "denoised". The term "denoise" is defined herein as noise removal, for example, the suppression or elimination of harmonic, ambient and/or coherent noise. After denoising this modified cascaded sweep data sequence, the listen time is extracted from the first data segment 131 and appended at the end of the denoised sequence as shown in FIG. 1d.

The basic idea of the noise attenuation method, here called denoising, is that the signal in different data segments is essentially the same except for the initial seismic sweep segment phase. Energy that does not obey this known phase behavior is considered to be noise and will be removed or attenuated.

The denoising process as applied to the modified cascaded sweep data of the four sweep segment example of FIG. 1c is now described with reference to the flowchart of FIG. 2. Cascaded sweep data are acquired 201 by recording data created by energy output from a vibrator source using a cascaded sweep series. The recorded data are then modified 203 as described for FIG. 1c so that the initial seismic sweep segment (Sw1) and final listen time (LA) are combined to form the initial segment 131 of the modified cascaded sweep data. A preferred method for combining a first sweep and final listen time is by time series addition.

As shown in FIG. 2, a data segment is selected as the target to denoise 205. In this example 131 is the target data segment. All other data segments (in this example 114, 118, 122) are phase shifted 207 to the phase corresponding to the phase of the sweep segment of the current target segment. A phase shift will be applied to each data segment so that the phase of the data segment's sweep segment phase corresponds to the phase of the target data segment. The target data segment 131 of the present example corresponds to the phase of sweep Sw1. The phase shift applied to the data segment 114 is a phase shift to change the phase of sweep segment Sw2 to the phase of the sweep Sw1. A phase shift is applied to data segment 118 that will change the phase of sweep segment Sw3 to the phase of sweep Sw1. The data segment 122 is phase shifted from the phase of the sweep segment Sw4 to the phase of sweep Sw1. The assumption is made that the signal in the different segments is now identical. The harmonics may be at different phases but most of the energy is contained in the fundamental.

In order to detect coherent noise, the data of the different data segments are compared. A difference between a target data segment and one or more of the other data segments is determined for the comparison. While numerical differences between data segments may be determined directly, comparing data measures of the data segments provides better sensitivity. In the preferred embodiment, the different data segments are compared using data measures within short time windows (for example windows ranging in length between 4 ms to 500 ms) using root-mean-square (RMS) values 209. The root-mean-square may be defined as the square root of the average of the squares of the samples within the data population, with the data population being the samples in corresponding data windows. Other data measures may be used for comparison within short windows, for example, measures of data power or data magnitude averages. The short windows for data comparison may be overlapped. If a window RMS value in the current target data segment 131 deviates too much (for example, exceeds a specified threshold) from that of the corresponding windows in all other data segments (114, 118, 122), or a combination of the other data segments, the window data in the current target data segment are replaced by an estimate of the signal. A specified threshold may be determined by methods well known in the art, for example the threshold may be based on measurements of amplitude, phase or frequency and may be combined with other parameters, for example, time and position. A specified threshold may be data dependent and may be variable from record to record. The estimate of the signal to be used for the replacement data may be derived from one or more of the other data segments. While the estimate of the signal to be used for the replacement data is derived using phase shifted data, the determination of the data measure for comparison (using RMS values in the preferred embodiment) may be prior to phase shifting the data segments.

A window in a data segment will have corresponding windows in the other data segments. For example, a data trace in 131 with a window between 100 ms to 200 ms as measured from the start of the sweep segment will have a corresponding window in the same trace of 114, 118 and 122 as measured from the start time of each of the sweep segments for those data segments.

In the preferred embodiment, the data used to replace target segment data exceeding a threshold is derived from at least one of the other data segments (114, 118 and/or 122). The replacement data, for example, can be the arithmetic average of the corresponding window data from one or more of the other data segments. Other averages used for replacement data may be a median or weighted average. In this example the arithmetic average of 114, 118 and 122 would be used to replace data in 131. If the target data segment comparison with at least one other data segment shows data deviation is negligible or does not fall above a specified threshold, the data remain unchanged.

After comparing data segments and replacing data if required, the data segments (131, 114, 118 and 122) are stacked 211 to form a new target data segment. This stacking suppresses ambient noise and removes the harmonics up to the order for which the cascaded pilot sweep was designed to cancel harmonics in the correlation process. The stack of these data segments, the new target data segment, is the final denoised target data segment. New modified target data segments to replace the original target data segments are created by stacking, though the original modified cascaded sweep data are used for the window RMS value comparison and for derivation of any replacement data.

This process is repeated 213 by selecting other segments as a target segment from the modified data. In the same manner as for the initial target data segment, a phase shift is applied to the non-target data segments that will shift the non-target data segments' corresponding sweep segment phase to the sweep segment phase corresponding to the target data segment. In this example, 114, 118 and 122 are individually treated as target data segments in the manner disclosed for 131. The final denoised target data segments are the stack combinations of all the data segments after phase shifting the data segments to the phase corresponding each target data segment's sweep segment phase.

Finally the listen time is extracted 215 from the first segment (131 in this example) and is appended at the end of the denoised cascaded sweep data (cf. FIG. 1d). A preferred method of extracting the listen time is by applying a time-varying low-cut filter to the denoised initial segment assuming upsweeps were used. The data may then be passed on to other data processing routines 217.

The denoising process as applied to the modified cascaded sweep data of the four sweep segment example of FIG. 1c is further described with reference to the flowchart of FIG. 5. Cascaded sweep data are acquired 501 by recording data created by energy output from a vibrator source using a cascaded sweep series. The recorded data are then modified 503 as described for FIG. 1c so that the initial sweep segment (Sw1) and final listen time (L4) are combined to form the initial segment 131 of the modified cascaded sweep data. A preferred method for combining a first sweep and final listen time is by time series addition.

Figure 5:
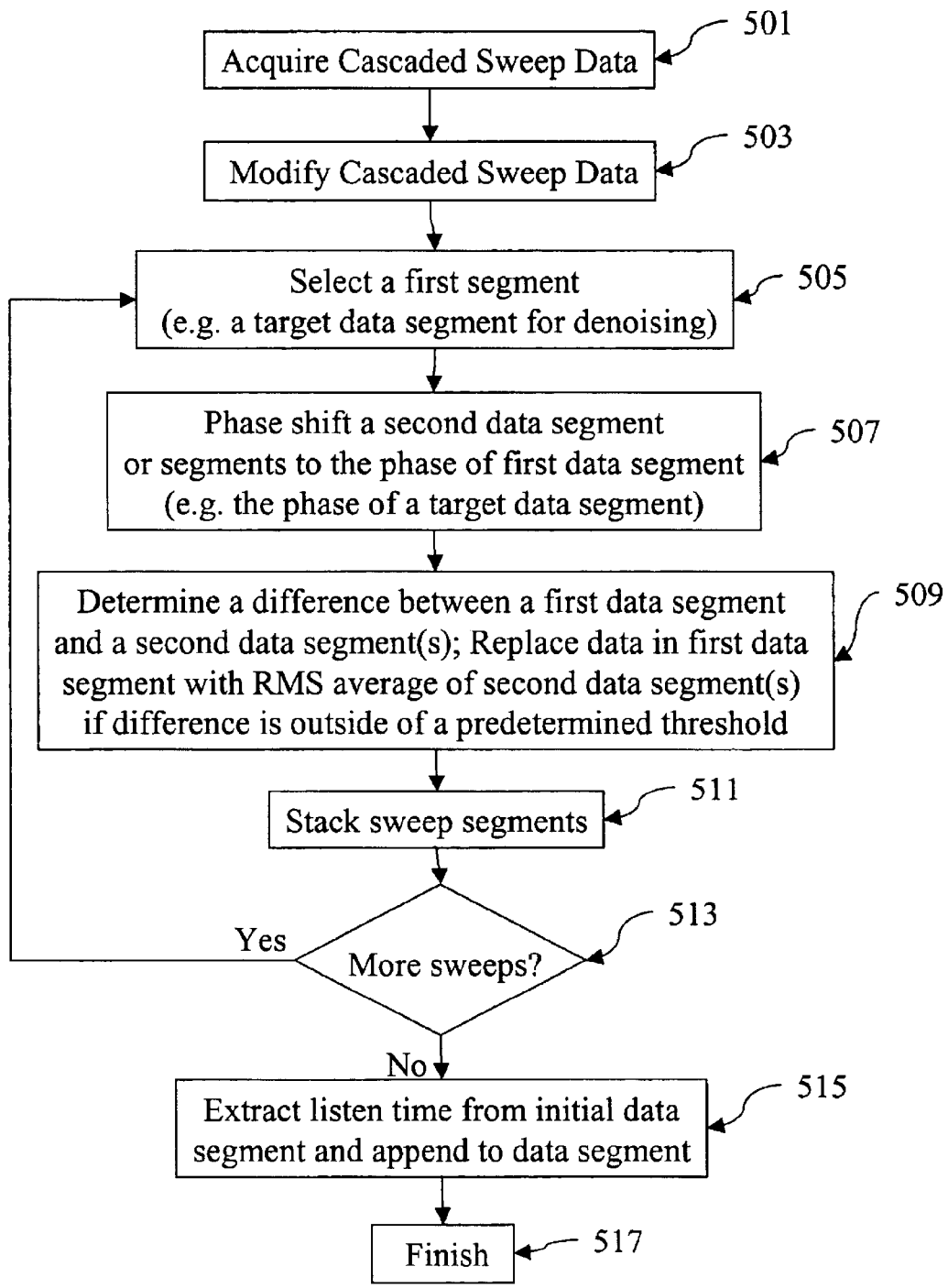
FIG. 5 is a flowchart of a denoising process as applied to a modified cascaded sweep data sequence.

As shown in FIG. 5, a first data segment is selected as the target to denoise 505. In this example 131 is the first data segment. Any or all other "second" data segments (in this example any or all of segments 114, 118, 122) are phase shifted 207 to the phase corresponding to the phase of the sweep segment of the first data segment. A phase shift will be applied to each data segment so that the phase of the data segment's sweep segment phase corresponds to the phase of the first or target data segment. The first data segment 131 of the present example corresponds to the phase of sweep Sw1. The phase shift applied to the data segment 114 is a phase shift to change the phase of sweep segment Sw2 to the phase of the sweep Sw1. A phase shift is applied to data segment 118 that will change the phase of sweep segment Sw3 to the phase of sweep Sw1. The data segment 122 is phase shifted from the phase of the sweep segment Sw4 to the phase of sweep Sw1.

In order to detect coherent noise, the data of the different data segments are compared. A difference between a first data segment and one or more of the second or other data segments is determined for the comparison. While numerical differences between data segments may be determined directly, comparing data measures of the data segments provides better sensitivity. In one embodiment, the different data segments are compared using data measures within short time windows (for example windows ranging in length between 4 ms to 500 ms) using root-mean-square (RMS) values (this may accomplished in step 509 as disclosed at 209). The root-mean-square may be defined as the square root of the average of the squares of the samples within the data population, with the data population being the samples in corresponding data windows. Other data measures may be used for comparison within short windows, for example, measures of data power or data magnitude averages. The short windows for data comparison may be overlapped. If a window RMS value in the current target data segment 131 deviates too much (for example, exceeds a specified threshold) from that of the corresponding windows in all other data segments (114, 118, 122), or a combination of the other data segments, the window data in the current target data segment are replaced by an estimate of the signal. A specified threshold may be determined by methods well known in the art, for example the threshold may be based on measurements of amplitude, phase or frequency and may be combined with other parameters, for example, time and position. A specified threshold may be data dependent and may be variable from record to record. The estimate of the signal to be used for the replacement data may be derived from one or more of the other data segments. While the estimate of the signal to be used for the replacement data is derived using phase shifted data, the determination of the data measure for comparison (using RMS values in the preferred embodiment) may be prior to phase shifting the data segments.

A window in a data segment will have corresponding windows in the other data segments. For example, a data trace in 131 with a window between 100 ms to 200 ms as measured from the start of the sweep segment will have a corresponding window in the same trace of 114, 118 and 122 as measured from the start time of each of the sweep segments for those data segments.

The data used to replace target segment data exceeding a threshold is derived from at least one of the other data segments (114, 118 and/or 122). The replacement data, for example, can be the arithmetic average of the corresponding window data from one or more of the other data segments. Other averages used for replacement data may be a median or weighted average. In this example the arithmetic average of 114, 118 and 122 would be used to replace data in 131. If the target data segment comparison with at least one other data segment shows data deviation is negligible or does not fall above a specified threshold, the data remain unchanged.

After comparing data segments and replacing data if required, the data segments (131, 114, 118 and 122) are stacked 511 to form a new target data segment. The stack of these data segments, the new target data segment, is the final denoised target data segment.

This process is repeated 513 by selecting other segments as a target segment from the modified data. In the same manner as for the initial target data segment, a phase shift is applied to the non-target data segments that will shift the non-target data segments' corresponding sweep segment phase to the sweep segment phase corresponding to the target data segment. In this example, 114, 118 and 122 are individually treated as target data segments in the manner disclosed for 131. The final denoised target data segments are the stack combinations of all the data segments after phase shifting the data segments to the phase corresponding each target data segment's sweep segment phase.

Finally the listen time is extracted 515 from the first segment (131 in this example) and is appended at the end of the denoised cascaded sweep data (cf. FIG 1d). A preferred method of extracting the listen time is by applying a time-varying low-cut filter to the denoised initial segment assuming upsweeps were used. The data may then be passed on to other data processing routines 517.

The preferred embodiment has been described for cascaded sweep data. The method may be used in an alternate embodiment for conventional sweep data by combining the conventional sweep into cascaded sweep data as disclosed with reference to FIG. 1a and FIG. 1b. Modified seismic data may be formed by adding the final listen time to the initial sweep segment period of the first data segment. The sweeps may be phase rotated in this method, but it is not required.

In still another alternate embodiment the method may be used with conventional sweep data where the data segments are not combined before application of the present invention. Seismic data are acquired using a plurality of seismic sweeps each including a listen time such as in FIG. 1A. Phase rotation may be performed depending on whether harmonic cancellation is possible from the acquisition parameters (for example, variphase acquisition), but phase rotation is not required. A difference is determined between a selected target data segment and at least one of remaining ones of said plurality of data segments. This difference may be determined using a data measure, for example the RMS value of the compared data. Data in the target data segment is replaced with data derived from at least one of the other data segments if the difference determined from the comparison exceeds a specified threshold. Data from the data segments may be stacked to form a new target data segment.

Figure 3:
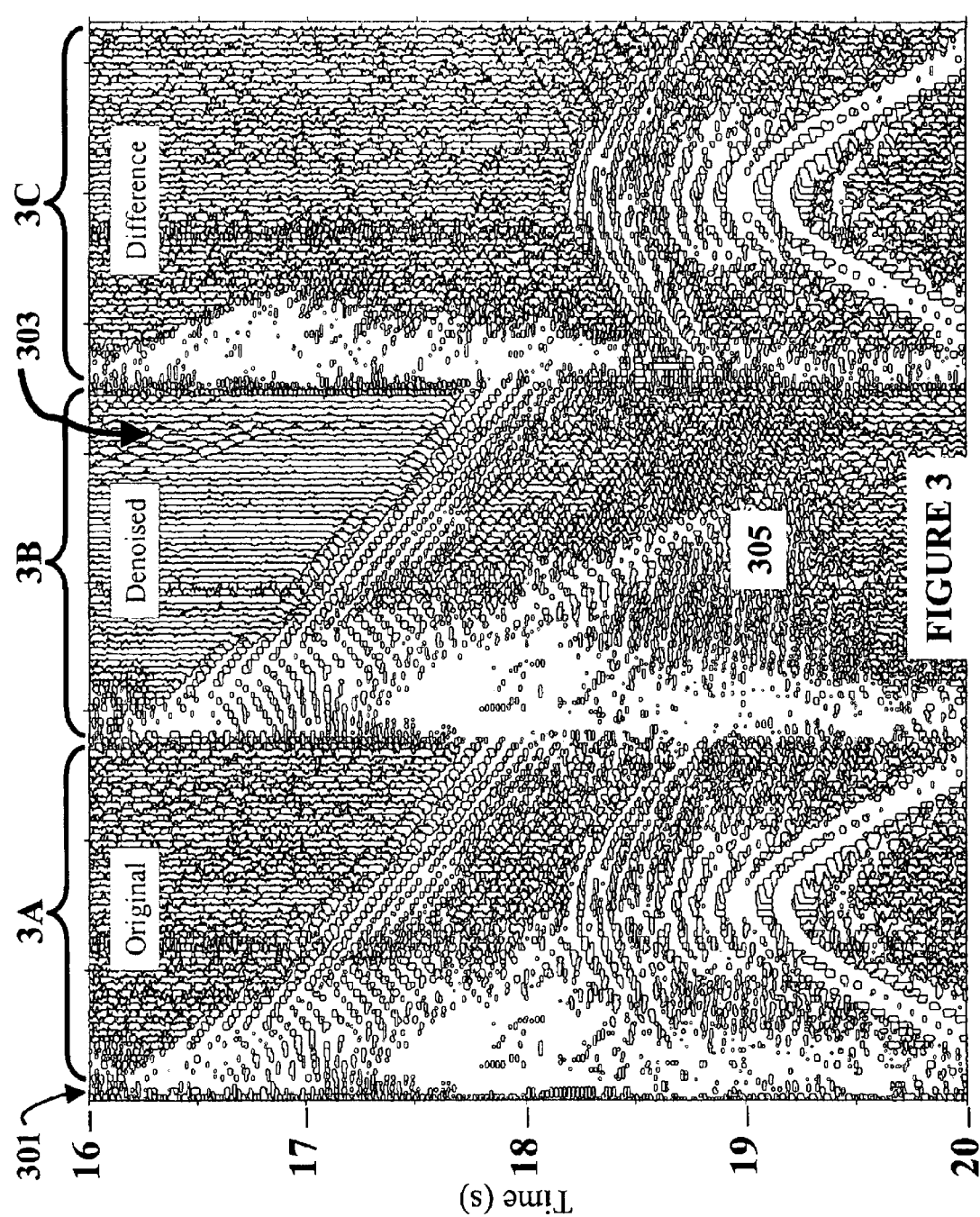
FIG. 3 illustrates data from a sweep sequence showing an original sweep sequence panel, a panel showing data with noise removed according to the method of the present invention, and the difference of the original and data panel after noise removal.
Figure 4:
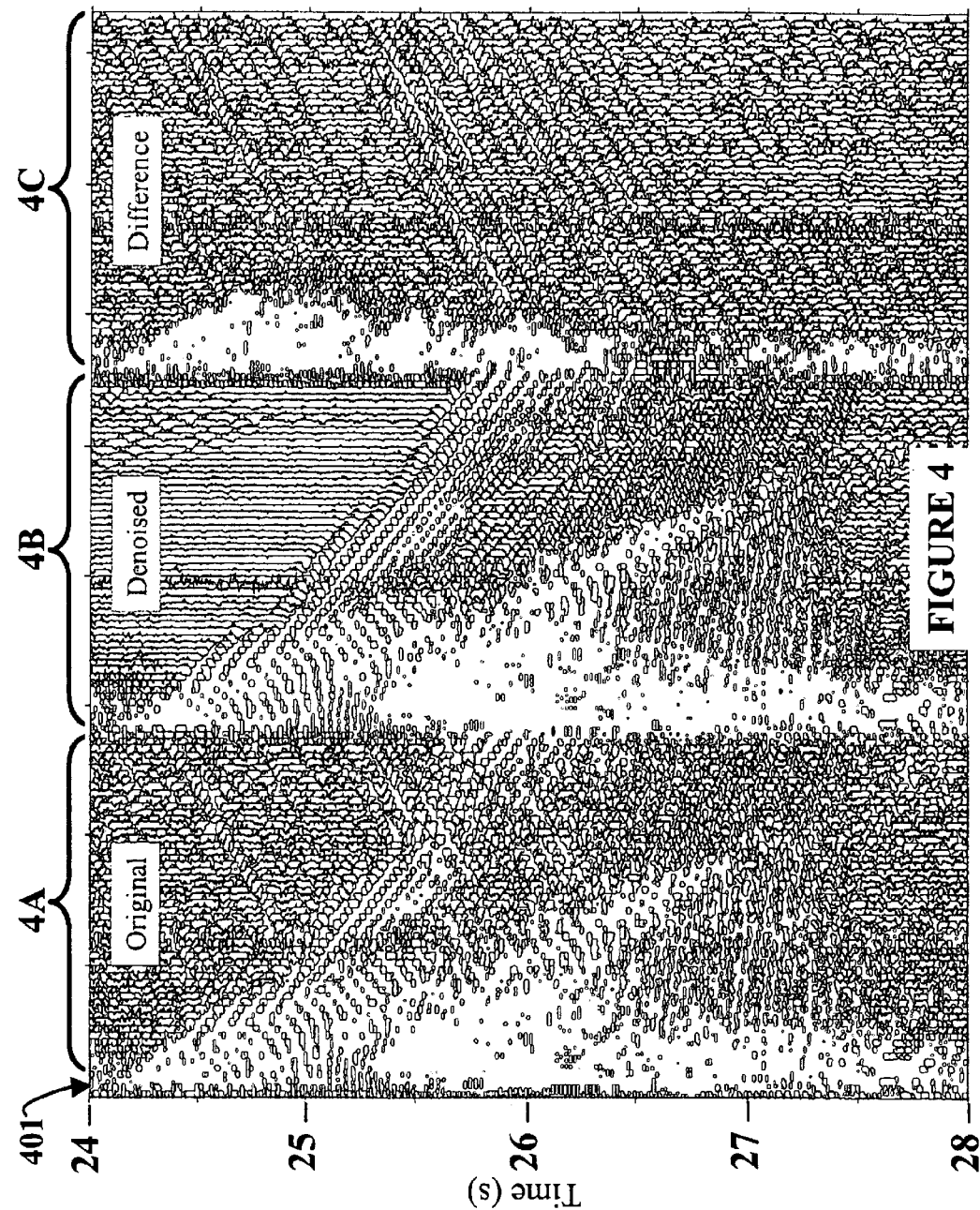
FIG. 4 illustrates data from a sweep sequence showing an original sweep sequence panel, a panel showing data after noise removal according to the method of the present invention, and the difference of the original and data panel after noise removal.

FIG. 3 and FIG. 4 show examples for the effectiveness of the denoising method as described in the preferred embodiment for target data sweep segments of a raw cascaded sweep data record that contains 8 sweep segments plus a listen period. The cascaded sweep sequence used to drive the vibrator to acquire the data record for these figures comprised eight 4-second sweep segments representing 32 seconds of total sweep time. The cascaded sweep data record includes the 32 seconds of total sweep time plus a four second listen time forming a 36 second record. The target data segment to be denoised from this data record shown in FIG. 3 is the $5^{th}$ data segment between 16 seconds and 20 seconds of the 36 seconds of the cascaded sweep data.

The left panel 3A of FIG. 3 is the original $5^{th}$ data segment recorded between 16 and 20 seconds of the 36 second data record. The center panel 3B of FIG. 3 is the same data segment after denoising according to the method of the present invention. The left panel 3C of FIG. 3 represents the difference between the original data 3A and the data after denoising 3B. The panel 3C is a representation of the noise that has been removed from the original $5^{th}$ data segment.

In FIG. 4, the $7^{th}$ sweep segment between 24 and 28 seconds of the 36 second cascaded sweep data record is the target data sweep segment to be denoised. The left panel 4A of FIG. 4 is the original data $7^{th}$ data segment recorded. The center panel 4B of FIG. 4 is the same data segment after denoising according to the method of the present invention. The left panel 4C of FIG. 4 represents the difference between the original data 4A and the data after denoising 4B. The panel 4C is a representation of the noise that has been removed from the original $7^{th}$ data segment.

An example of a corresponding window between the $5^{th}$ sweep in FIG. 3 and the $7^{th}$ sweep in FIG. 4 is the 1000 ms period of time of the first trace 301 in FIG. 3 between 16 seconds and 17 seconds which corresponds to the 1000 ms period of time of the first trace 401 of FIG. 4 between 24 seconds and 25 seconds. When the $5^{th}$ data segment is the target data segment for denoising, the $7^{th}$ data segment will comprise one of the other data segments to which a phase shift will be applied before corresponding data windows are compared.

Comparison of the original data panels 3A, 4A to the denoised data panels 3B, 4B data show that the coherent noise has been removed and the reflections (e.g. around 305 in FIG. 3), originally masked by this noise, are now well visible. Ambient noise is vastly suppressed. The low frequency energy in the upper right corner of the Original and Denoised panels (cf. 303 in panel 3B of FIG. 3 and similar regions in 3A, 4A and 4B) is ground roll energy originated from a previous sweep segment. Both, the signal and the ground roll are common in all segments and therefore are not targeted by the denoising process. The difference plot noise representations 3C in FIGS. 3 and 4C in FIG. 4 demonstrate the tremendous amount of noise that can be removed from the recorded data records without affecting the signal.

Persons skilled in the art will understand that the method described herein may be practiced as disclosed, including but not limited to the embodiments described. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A method for processing seismic data comprising:
   (a) determining a difference for data in a window comprising a portion of a first data segment with data in a corresponding window comprising a portion of a second data segment, wherein said first data segment and said second data segment are selected from a plurality of data segments acquired using a plurality of seismic sweeps; and
   (b) changing said data in said first data segment using said data in a corresponding window comprising a portion of a second data segment based on said difference.

2. The method of claim 1, wherein changing said data in said first data segment further comprises replacing said data in a window using said data in a corresponding window.

3. The method of claim 1 further comprising stacking said plurality of data segments to form a new data segment.

4. The method of claim 3 further comprising extracting a listen time from said new data segment.

5. The method of claim 1 wherein said plurality of data segments each comprise a recorded data and a listen time.

6. The method of claim 1 further comprising phase shifting said second data segment to a phase corresponding to said first data segment.

7. The method of claim 1 wherein said second data segment comprises a combination of a plurality of said plurality of data segments.

8. The method of claim 7 wherein said combination comprises combining said plurality of said plurality of data segments using at least one of: i) an arithmetic average, ii) a median average, and iii) a weighted average.

9. The method of claim 1 further comprising using RMS values for determining said difference in said data in a window of a first data segment with said data in a window of a second data segment.

10. The method of claim 1 wherein a listen time data segment is combined with an initial data segment by time series addition.

* * * * *